US010281275B2

(12) United States Patent
Voigtlander

(10) Patent No.: US 10,281,275 B2
(45) Date of Patent: May 7, 2019

(54) ARRANGEMENT FOR OPTICALLY CAPTURING A SPACE FROM A PLURALITY OF DIRECTIONS

(71) Applicant: Shoogee Gmbh & CO. KG, Munster (DE)

(72) Inventor: Arne Voigtlander, Munster (DE)

(73) Assignee: Shoogee Gmbg & Co. KG (DE)

( * ) Notice: Subject to any disclaimer, the term of this patent is extended or adjusted under 35 U.S.C. 154(b) by 0 days.

(21) Appl. No.: 15/318,327

(22) PCT Filed: Jun. 12, 2015

(86) PCT No.: PCT/EP2015/063200
§ 371 (c)(1),
(2) Date: Dec. 12, 2016

(87) PCT Pub. No.: WO2015/189403
PCT Pub. Date: Dec. 17, 2015

(65) Prior Publication Data
US 2017/0122732 A1    May 4, 2017

(30) Foreign Application Priority Data
Jun. 12, 2014 (DE) .......................... 10 2014 108 317

(51) Int. Cl.
*G02B 27/14* (2006.01)
*G01C 11/02* (2006.01)
(Continued)

(52) U.S. Cl.
CPC ............ *G01C 11/02* (2013.01); *G01B 11/245* (2013.01); *G01C 11/06* (2013.01); *G01S 11/12* (2013.01);
(Continued)

(58) Field of Classification Search
CPC ........... H04N 5/23238; H04N 13/0282; H04N 13/0203; H04N 13/0217; H04N 13/0007;
(Continued)

(56) References Cited

U.S. PATENT DOCUMENTS

2004/0264013 A1* 12/2004 Matsuki ................. G02B 13/06
359/871
2010/0045773 A1* 2/2010 Ritchey .................. G02B 13/06
348/36
(Continued)

FOREIGN PATENT DOCUMENTS

DE        202012008568    9/2012
FR        2150221         4/1973
(Continued)

OTHER PUBLICATIONS

International Search Report for PCT/EP2015/063200 dated Sep. 10, 2015.

*Primary Examiner* — Alicia M Harrington
(74) *Attorney, Agent, or Firm* — Kegler, Brown, Hill & Ritter Co., LPA; Lorraine Hernandez

(57) ABSTRACT

The invention proposes an arrangement for optically capturing a space from a plurality of directions, having first deflection elements for deflecting optical rays, a second deflection element, and a camera arranged downstream from the second deflection element, wherein at least three first deflection elements are provided that are arranged so as to be mutually spaced apart on a plane and are aligned such that they direct optical rays, referred to as partial images, that are incident in parallel from different directions to the second deflection element, referred to as a splitter, and wherein the splitter is embodied such that it deflects the partial images back substantially in their original direction of radiation and into the capture range of the camera.

11 Claims, 3 Drawing Sheets

(51) Int. Cl.
  *G01S 11/12* (2006.01)
  *G01C 11/06* (2006.01)
  *G01B 11/245* (2006.01)
  *G02B 17/00* (2006.01)
  *G02B 17/08* (2006.01)
  *G02B 27/10* (2006.01)

(52) U.S. Cl.
  CPC ........... *G02B 17/002* (2013.01); *G02B 17/08* (2013.01); *G02B 27/1066* (2013.01)

(58) Field of Classification Search
  CPC .......... H04N 9/097; G06T 2207/20221; G06T 2207/20212; G02B 13/06; G02B 27/1066; G02B 17/08; G02B 17/002; G01C 11/02; G01C 11/06
  See application file for complete search history.

(56) References Cited

U.S. PATENT DOCUMENTS

2013/0127997 A1   5/2013   Inomoto
2015/0296139 A1*  10/2015  Onyenobi .......... H04N 5/23238
                                              348/36

FOREIGN PATENT DOCUMENTS

FR        2982377        5/2013
WO     2014017409        1/2014

* cited by examiner

ARRANGEMENT FOR OPTICALLY CAPTURING A SPACE FROM A PLURALITY OF DIRECTIONS

CROSS-REFERENCE TO RELATED APPLICATIONS

This application is U.S. national phase of and claims priority to international application PCT/EP2015/063200, filed on Jun. 12, 2015, and claims priority to German Patent Application No. 102014108317.2, filed on Jun. 12, 2014, each of which are herein incorporated by reference.

BACKGROUND OF THE INVENTION

The invention relates to an arrangement for optically capturing a space from a plurality of directions.

It is desirable in many cases if, by means of technical devices, a clear determination of a position in space is enabled by evaluating camera images from a plurality of directions. In principle, this is possible with the aid of a stereoscopic camera arrangement. In this case, the overall recorded image consists of two partial images that are recorded from two lines of sight that are parallel or oblique to one another. Unlike human beings, who process stereoscopic images with two eyes, automated stereoscopic image processing requires a very large amount of computing power. Specifically, a lot of detail information is considered by the human being, often without him being aware of it. For example, such information includes the proportions, which are used for an initial, rough estimation of the spatial arrangement of certain objects even without stereoscopic image information. Translated to the automatic evaluation of stereoscopic images, this would mean that the object in question would first need to be identified in the image, and that typical dimensional information on a great number of objects of an extreme variety of types would need to be stored in a memory and then called up and evaluated, and the object in question would first have to be identified in the image.

Consequently, substantial computing power is required for automatic image analysis, particularly if the space does not have any defined characteristics that are stored in a computational model or electronic memory, but rather the position must be determined in any unknown space by means of automatic image analysis.

Moreover, an arrangement is known which has several sensors, such as positional and acceleration sensors, for example, as well as a camera, which records a single overall image that is not divided into partial images. The components of such an arrangement are often present in mobile electronic devices such as smartphones, tables and the like, so that, by means of a suitable program running on the device, an automatic, an image-based positional determination can be made. First, this arrangement is used to record an image of the entire space and calculate its own, first position in the space. Starting from this initial, optically detected position in space, further movements through the space are determined computationally with the aid of the sensors. Since the sensor information has slight errors or discrepancies that gradually accumulate, an increasing deviation of the sensorially calculated position from the actual position occurs over time, which is referred to as "drift."

A generic arrangement for optically capturing a space from a plurality of directions is known from U.S. Pat. No. 3,055,265A that has first and second deflection elements for deflecting optical rays striking the first deflection elements from different directions. A camera is arranged downstream from the deflection elements, so that the camera can record panoramic images in such a way that no continuous panoramic image is stored, but rather a plurality of partial images are exposed on a film in a predetermined arrangement. The predetermined arrangement of the partial images on the film is different from the actual arrangement in which the corresponding parts of the image are arranged in the space.

A projection system is known from U.S. Pat. No. 3,144,806A that uses a standard projector to arrange several partial images that are projected simultaneously into a single larger, complete image, with an arrangement of optical deflection elements being disposed in front of the projector and hence downstream from the projector in the optical path. For this, it is required that the images be recorded using specially designed or converted in such a way that each image stored by the camera contains the corresponding partial images.

BRIEF SUMMARY OF THE INVENTION

It is the object of the invention to provide an arrangement for optically capturing a space from a plurality of directions, which with low computing power and high precision, enables the current position in an unknown space to be determined automatically.

This object is achieved by an arrangement according to claim 1. Advantageous embodiments are described in the subclaims.

In other words, the invention proposes the analysis of three or more partial images instead of two partial images as used in stereoscopic image acquisition. A provision is also made that one does not resort, accordingly, to the use of three or more cameras, but only a single camera. The image recorded by this camera is subdivided into three or more partial images with the aid of a plurality of optical deflection elements.

Through the use of only a single camera, the costs of the proposed arrangement is kept to a minimum. Instead of several cameras, relatively economical deflection elements for optical rays such as prisms or mirrors, for example, can be used.

By virtue of the fact that it is not necessary to use several cameras, it is also not necessary to precisely synchronize the different shutter speeds of several cameras with one another, or—specifically with non-synchronous cameras—to analyze the individual non-synchronized camera images, which involves high computational complexity.

Through the proposed analysis of the camera images, the positional determination can be made free of the drift effect and with a commensurately high level of precision. However, sensor signals can also be analyzed, or the sensor signals can in principle be used for the positional determination, and the camera images can be used to reduce or eliminate the drift effect by correcting the position calculated based on the sensor data either continuously or in intervals.

As a result of the proposed analysis of at least three partial images, it is possible, unlike with stereoscopic image analysis, to achieve exact spatial positioning of all image points and thus an exact calculation of the current position occupied by the camera within this space.

In order to subdivide the detected angle of view captured by the camera into a plurality of partial images, a so-called splitter, i.e., a deflection element, is arranged upstream from the camera that splits the optical rays of the camera capture range into a plurality of partial images. This can be a three-sided pyramid or an appropriate shaped prism, for example, with this respective splitter deflecting to the camera partial images arriving at it from three directions.

In these three abovementioned directions, deflection elements are likewise arranged on a plane and spaced apart from one another at a distance from the splitter. This results in a ray path that is approximately S-shaped or Z-shaped overall in which the three mutually spaced-apart, parallel rays reach the three first deflection elements, are deflected by these to the splitter, and deflected by the splitter to the camera substantially in their original direction of radiation, but now laterally offset. According to the ray path, the at least three deflection elements arranged at a distance from the splitter are referred to as first deflection elements, and the partial images deflected by these first deflection elements then reach the splitter as the so-called second deflection element, and travel from there into the camera.

As explained previously, three or more first deflection elements and, accordingly, three or more partial images, enable an exact positional determination in space. Advantageously, the number of first deflection elements can be limited to three or four. Five or more first deflection elements and, accordingly, five or more partial images, would result in increased computational complexity in the analysis of the individual partial images, so a limitation to three or four partial images represents a compromise between precise spatial orientation on the one hand and minimal computational complexity on the other hand. The use of four partial images enables optimal exploitation of a rectangular display, for example, to display the four partial images, or the optimal utilization of the area of a rectangular image sensor onto which the four partial images are deflected, so that the precision of the image analysis can be optimized through its optimal area utilization.

Advantageously, the first deflection elements can be arranged at equal distances from the splitter, namely on a circular path at whose center point the splitter is located.

Advantageously, an optical lens can be arranged between the splitter and the camera and be embodied as a converging lens, so that parallel optical rays arriving from the splitter can be bundled into the aperture of the camera, thereby enabling as much of the image information arriving from the splitter as possible to be captured by the camera.

To adapt to different camera types, the abovementioned lens can advantageously be displaceably supported, whereby its distance to the splitter and to the camera can be changed. After this adjustment has been made, the lens can be fixed in its respective position. In this way, the arrangement can be operated with different cameras and, advantageously in terms of cost, always have the same splitter and first deflection elements without the need to adapt these each individually to different types of camera. Instead, this adaptation is achieved through the displaceable converging lens.

Advantageously, a provision can be made that an optical lens is arranged between a first deflection element and the splitter. In this way, the rays of a partial image that is deflected by the first deflection element to the splitter are able to reach the splitter to the greatest possible extent.

The aforementioned optical lenses—either between the first deflection element and the splitter or between the splitter and the camera—can advantageously be intentionally shaped such that they produce distortions. This proposal is based on the consideration that distortions can be compensated for in this way that otherwise occur in the ray path and would have to be computationally equalized during the image analysis. Through the intentionally distorting configuration of the optical lenses, optical distortion that occurs otherwise in the ray path can be compensated for by purely optical means, thus keeping the computational complexity of the image analysis at a minimum. The optical distortion occurring in the ray path enables the use of especially economical optical elements, for example.

In principle, the proposed arrangement can be equipped with its own camera. In the interest of a maximally economical design, however, a provision can be made that the camera is embodied as a separate element that a customer may already have in his possession. The first and second deflection elements are therefore advantageously arranged in a holding fixture that is designed as an attachment for the camera. This attachment or holding fixture has a receptacle that enables the attachment to be fixed to the camera.

In this connection, a provision can advantageously be made that the camera is designed as a component of a mobile electronic device, for example as a component of a mobile telephone, a so-called phablet or tablet. In these cases, the mobile electronic devices not only provide the camera, but also an electronic memory in which the required program for automatic image analysis can be stored, as well as a processing unit, e.g., a microprocessor, to run the program. In this case, the proposed arrangement has two separate, interconnectable hardware components, namely the mobile electronic device and the attachment.

The receptacle on the holding fixture of the attachment enables the mobile electronic device to be fixed to the holding fixture in this case, so that the user can move freely through the space with this mobile electronic device, his instantaneous position can be determined by means of the proposed arrangement, and image content can be reproduced accordingly on the display of the mobile electronic device that take this position of the user in the space into account. For example, this display can be used to mix factual information of the space with additional information, as is known from the area of "augmented reality." For instance, a game environment can be displayed for the user that is structured as an archaic building, cave, or the like, and in which obstacles are shown that coincide with the actual obstacles present in the space, so that the player can move around safely in this virtual game environment without actually damaging the obstacles present in the space or injuring himself on these obstacles.

For example, a provision can be made that the player, in an inherently known manner, wears a display similar to eyeglasses in front of his eyes, and the virtual environment is represented on this display. The display can particularly be part of a mobile electronic device. The user wears the eyeglass-like device along with the device as well as the abovementioned attachment—that is, all in all, a proposed arrangement, so that current spatial information is constantly being captured via the arrangement while the player is moving in the space or changes his viewing direction in the space. These movements that the player makes with his head or with his entire body bring about a positional change of the camera with regard to its location in the space and/or its image acquisition alignment in the space and can be processed to correct the perspective that is being respectively reproduced on the display.

While, in the exemplary application described above, the user moves the arrangement in the space while playing an electronic game as a player, for example, a provision can be made in a second exemplary application that the space is first captured by means of the proposed arrangement. For this purpose, the proposed arrangement is moved through the space until all of the parameters of this space have been optically acquired. These parameters are stored, and any virtual location can be incorporated later based on this stored spatial information, even if the user is not actually at this location, and the same, previously captured space can be represented from different lines of sight from these calculated locations. For example, this makes it possible to optically capture a room and then put the user, who is also referred to as a "player" in this case, in the role of a housefly that can then move throughout the entire room and observe the room from different locations and from different respective viewing directions, while the player can in fact remain stationary at a certain position the entire time.

DETAILED DESCRIPTION OF THE DRAWINGS

Figure 1:
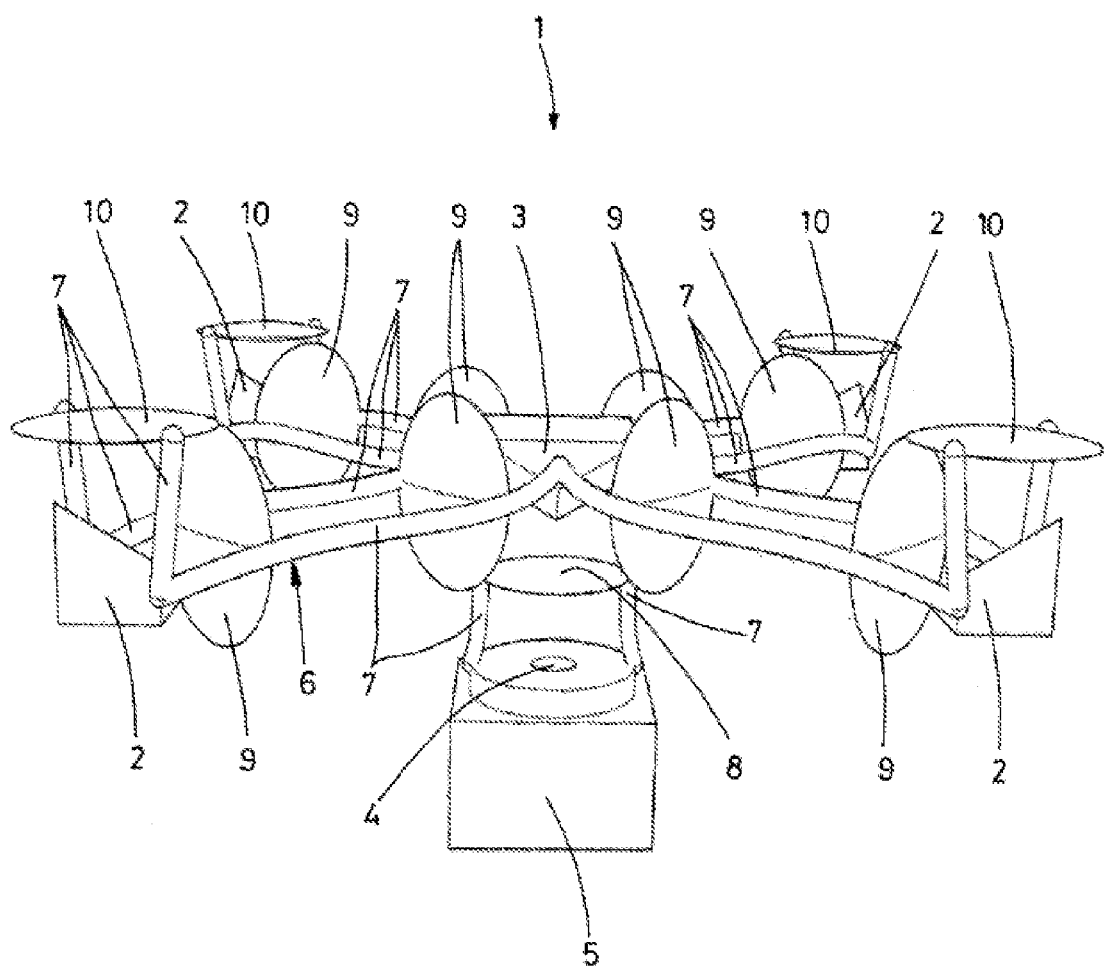
FIG. 1 illustrates a schematic view of the invention.
Figure 2:
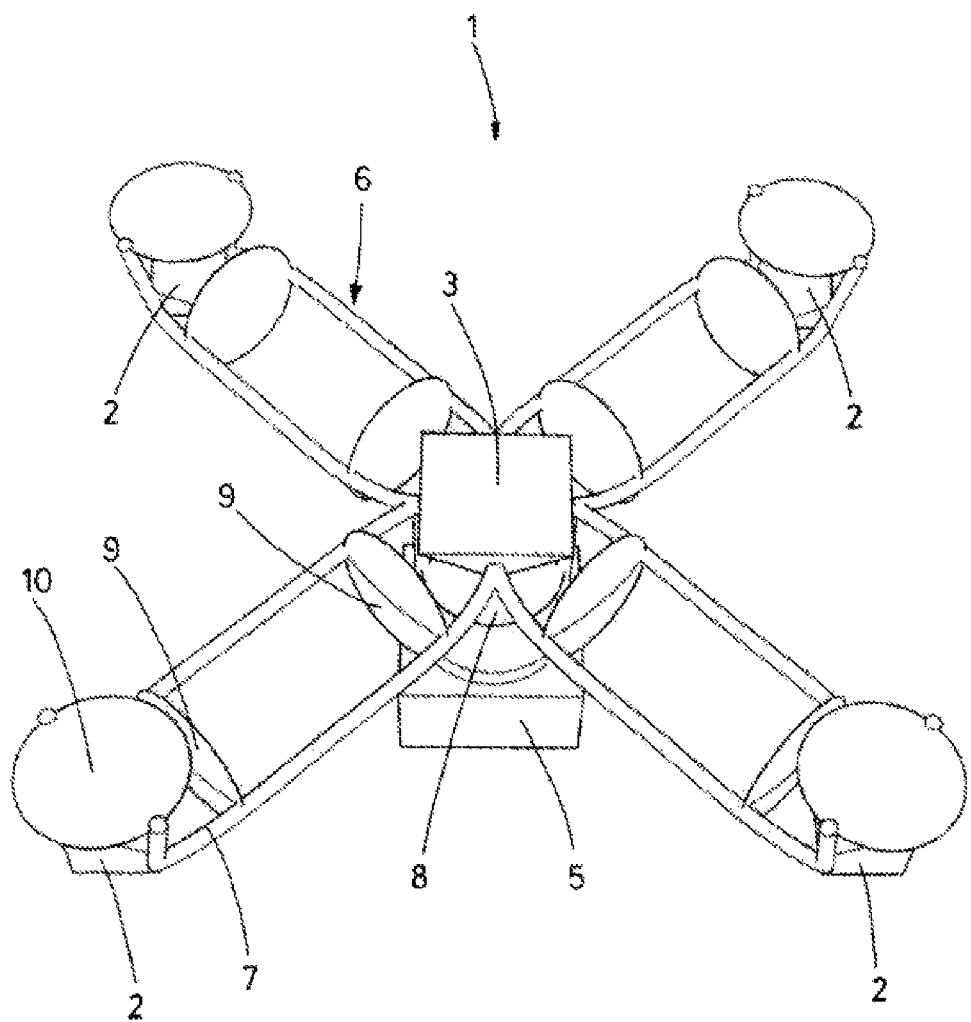
FIG. 2 illustrates a schematic view of the invention.
Figure 3:
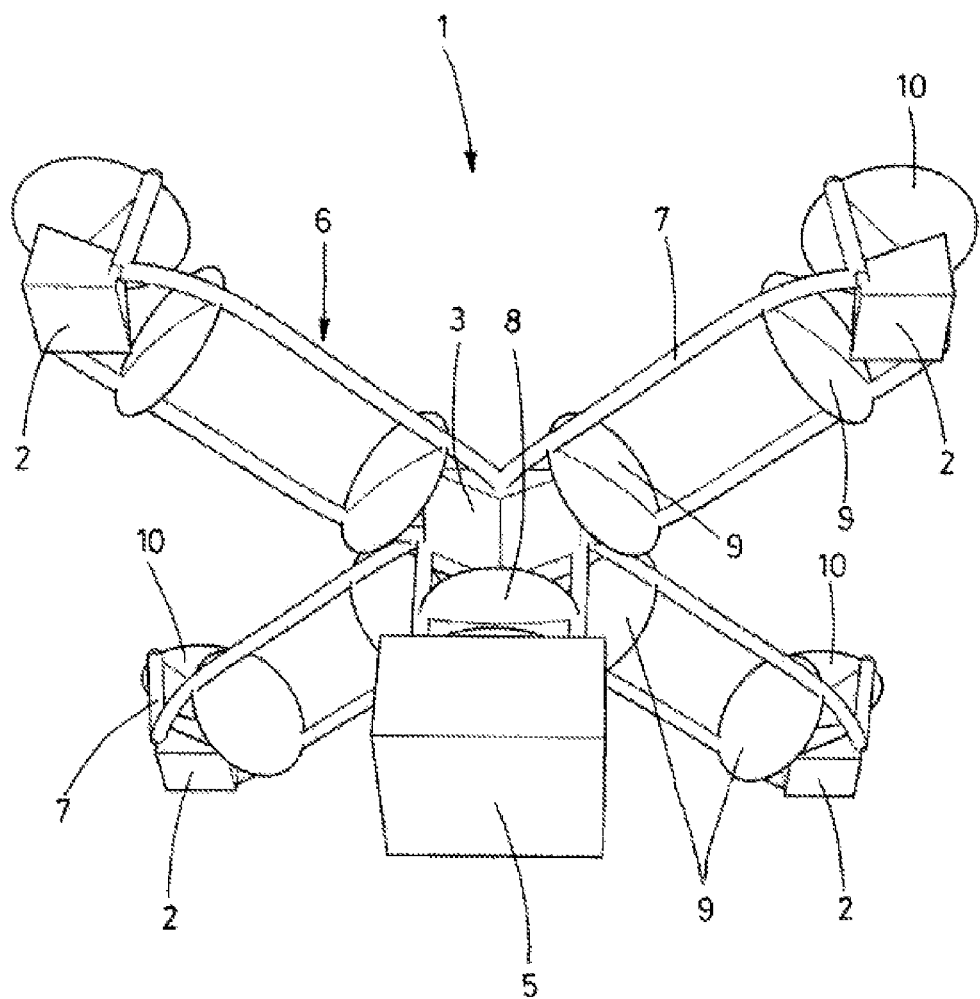
FIG. 3 illustrates a schematic view of the invention.

An exemplary embodiment of a proposed arrangement is explained in further detail below with reference to the merely schematic drawings. FIGS. 1-3 show an arrangement for optically capturing a space from a plurality of directions, with this arrangement being shown from different viewing directions in the drawings. In the drawings, 1 designates an overall arrangement that is used to capture a room on the basis of four partial images. FIG. 1 shows the arrangement 1 in a flat perspective view from the side and slightly from above, FIG. 2 in a steeper perspective view from above, and FIG. 3 shows the arrangement 1 in a perspective view from below.

The arrangement 1 has four first deflection elements 2, each of which produces a partial image. For example, parallel rays strike the first deflection elements 2; according to the depiction in FIG. 1, in the vertical direction of that figure, they strike the oblique surfaces of these first deflection elements 2. The rays are deflected by approximately 90° and strike a four-sided pyramid, which represents a second deflection element and is referred to as a splitter 3. One of the four sides of the splitter 3 is associated with each first deflection element 2, so that the rays of a first deflection element 2 strike only one side of the splitter 3. From the splitter 3, the four partial images—again deflected by approximately 90° and now again in the abovementioned vertical direction—reach an objective 4 of a camera 5, so that each partial image travels in an approximately S-shaped or Z-shaped ray path from the first deflection element 2 to the camera 5.

A holding fixture 6 having a plurality of bars 7 is shown only schematically in FIG. 1. The first deflection elements 2 and the splitter 3 are fastened to the bars 7, and the holding fixture 6, in turn, is fastened to the camera 5.

An optical lens 8 is arranged between the camera 5 and the splitter 3. Other optical lenses 9 are arranged between the first deflection elements 2 and the splitter 3, and an optical lens 10 is also provided in front of each first deflection element 2. The depicted number of lenses, particularly of the lenses 9 and 10, is intended to schematically indicate the possible locations where optical lenses can be provided in the arrangement 1, for example in order to filter out certain rays or in order to intentionally create optical distortions, thereby compensating for optical distortions that can otherwise occur at the first deflection elements 2 and the splitter 3, particularly if the first deflection elements 2 and the splitter 3 are components of limited optical precision—inexpensive components made of plastic, for example.

In the depicted exemplary embodiment, the camera 5 constitutes part of the arrangement 1 and is also securely connected to the holding fixture 6. In departure from this, a provision can be made that the holding fixture 6 carries the first deflection elements 2 and the splitter 3 and also has the bars 7 on which the lenses 8 and optionally 9 and also optionally 10 are held. Unlike the depicted exemplary embodiment, such an arrangement without the camera 5 would have connecting means in order to create a receptacle in which either a camera or a device can be received which, in turn, has a camera—for example, a mobile telephone or the like.

What is claimed is:

1. An arrangement for optically capturing a space from a plurality of directions, comprising:
   a plurality of first deflection elements for deflecting optical rays, a second deflection element, and a camera arranged downstream from the second deflection element,
   wherein the plurality of first deflection elements are arranged so as to be mutually spaced apart on a plane and are aligned such that the plurality of first deflection elements direct optical rays that are incident in parallel from different directions to the second deflection element and wherein the second deflection element is embodied such that the second deflection element deflects the optical rays back substantially in their original direction of radiation and into a capture range of the camera;
   wherein the plurality of first deflection elements and the second deflection element are arranged in a holding fixture, the holding fixture including an attachment for the camera and a receptacle,
   wherein the camera is a component of a mobile electronic device with a display, the holding fixture including at least one lens placed in front of the display relative to a user.

2. The arrangement as set forth in claim 1, characterized in that three or four first deflection elements are provided.

3. The arrangement as set forth in claim 2, characterized in that the plurality of first deflection elements are arranged on a circular path lying at equal distances from the second deflection element.

4. The arrangement as set forth in claim 1, characterized in that the plurality of first deflection elements are arranged on a circular path lying at equal distances from the second deflection element.

5. The arrangement as set forth in claim 4, characterized in that an optical lens is arranged between the second deflection element and the camera, with the lens being embodied as a converging lens, so that optical rays emerging in parallel from the second deflection element are bundled into the objective of the camera.

6. The arrangement as set forth in claim 1 characterized in that an optical lens is arranged between the second deflection element and the camera, with the lens being embodied as a converging lens, so that optical rays emerging in parallel from the second deflection element are bundled into the objective of the camera.

7. The arrangement as set forth in claim 6, characterized in that the lens is displaceably supported, so that its distance to the second deflection element or to the camera can be changed, and that the lens can be fixed in its respective position.

8. The arrangement as set forth in claim 6 characterized in that an optical lens is arranged between a first deflection element and the second deflection element.

9. The arrangement as set forth in claim 8, characterized in that the lens is shaped so as to produce distortions, so that optical distortions that occur between a first deflection element and the second deflection element or between the second deflection element and the camera are compensated for by means of the distortions produced by the lens.

10. The arrangement as set forth in claim 6, characterized in that the lens is shaped so as to produce distortions, so that optical distortions that occur between a first deflection element and the second deflection element or between the second deflection element and the camera are compensated for by means of the distortions produced by the lens.

11. The arrangement as set forth in claim 1, wherein the mobile electronic device is a mobile telephone, phablet or tablet, and the holding fixture-of the attachment is designed so as to enable the mobile electronic device be fixed in place.

* * * * *